US012671022B2

(12) United States Patent
Ladani et al.

(10) Patent No.: US 12,671,022 B2
(45) Date of Patent: Jun. 30, 2026

(54) BUSHING COMPRISING A CONDENSER BODY AND ELECTRICAL FACILITY WITH BUSHING

(71) Applicant: HITACHI ENERGY LTD, Zürich (CH)

(72) Inventors: Mital Ladani, Keshod (IN); T. Balakrishnan, Bhavani (IN); S. Saravanan, Vadodara (IN); Harshad Jadav, Gujarat (IN); M. Hrishikesh, Gujarat (IN)

(73) Assignee: HITACHI ENERGY LTD, Zürich (CH)

( * ) Notice: Subject to any disclaimer, the term of this patent is extended or adjusted under 35 U.S.C. 154(b) by 218 days.

(21) Appl. No.: 18/555,942

(22) PCT Filed: Feb. 7, 2022

(86) PCT No.: PCT/EP2022/052874
§ 371 (c)(1),
(2) Date: Oct. 18, 2023

(87) PCT Pub. No.: WO2022/223161
PCT Pub. Date: Oct. 27, 2022

(65) Prior Publication Data
US 2024/0203633 A1 Jun. 20, 2024

(30) Foreign Application Priority Data
Apr. 21, 2021 (EP) .................................... 21169580

(51) Int. Cl.
*H01F 27/04* (2006.01)
*H01B 3/18* (2006.01)
(Continued)

(52) U.S. Cl.
CPC ............. *H01F 27/04* (2013.01); *H01B 3/185* (2013.01); *H01B 3/20* (2013.01); *H01B 3/485* (2013.01); *H01B 17/583* (2013.01)

(58) Field of Classification Search
None
See application file for complete search history.

(56) References Cited

U.S. PATENT DOCUMENTS 1,873,978 A * 8/1932 Nichols .................. H01F 27/04 336/107
1,957,982 A * 5/1934 Smith .................... H01B 17/28 174/31 R
(Continued)

FOREIGN PATENT DOCUMENTS

CA 645157 A 7/1962
CN 106854843 A * 6/2017 ................ D21J 1/20
(Continued)

OTHER PUBLICATIONS

High_temperature. Ferrito. IEEE. (Year: 2001).*
(Continued)

*Primary Examiner* — Timothy J. Dole
*Assistant Examiner* — Muhammed Azam
(74) *Attorney, Agent, or Firm* — Sage Patent Group

(57) ABSTRACT

A bushing comprises an electrical conductor and a condenser body through which the electrical conductor extends, wherein the condenser body comprises electrically insulating layers and electrically conducting layers, wherein the electrically insulating layers comprise an oil-impregnated paper comprising at least one of a thermally upgraded paper and a paper comprising synthetic fibers.

7 Claims, 2 Drawing Sheets

(51) Int. Cl.

| | |
|---|---|
| ***H01B 3/20*** | (2006.01) |
| ***H01B 3/48*** | (2006.01) |
| ***H01B 17/58*** | (2006.01) |

(56) References Cited

U.S. PATENT DOCUMENTS

| | | | | |
|---|---|---|---|---|
| 2,600,979 | A * | 6/1952 | Dormont | H01F 27/04 174/12 R |
| 3,097,346 | A * | 7/1963 | Horelick | H01F 27/02 336/98 |
| 3,588,319 | A * | 6/1971 | Isogai et al. | H01B 17/28 174/31 R |
| 4,227,035 | A * | 10/1980 | Runnels | H01B 17/36 174/31 R |
| 4,347,169 | A * | 8/1982 | Sato | C10M 105/06 252/570 |
| 5,171,918 | A * | 12/1992 | Shubkin | C07C 9/22 585/12 |
| 5,949,017 | A * | 9/1999 | Oommen | H01B 3/20 174/17 LF |
| 6,398,986 | B1 * | 6/2002 | McShane | H01F 27/125 174/17 LF |
| 6,980,076 | B1 * | 12/2005 | Rolling | H01B 3/52 174/124 R |
| 9,870,847 | B2 * | 1/2018 | Hedlund | H01G 4/32 |
| 11,831,133 | B2 * | 11/2023 | Hedlund | G01R 31/1245 |
| 12,261,421 | B2 * | 3/2025 | Czyzewski | H02G 15/072 |
| 2002/0027219 | A1 * | 3/2002 | Oommen | C10M 169/04 252/570 |
| 2005/0072964 | A1 * | 4/2005 | Rapp | H01B 3/22 252/570 |
| 2011/0232940 | A1 * | 9/2011 | Hwang | H01B 3/185 977/785 |
| 2013/0255899 | A1 | 10/2013 | Krahn et al. | |
| 2013/0337249 | A1 * | 12/2013 | Fenyvesi | H01B 3/50 442/364 |
| 2014/0054519 | A1 * | 2/2014 | Parodi | A23D 9/00 252/579 |
| 2014/0131634 | A1 * | 5/2014 | Sunkara | H01B 3/20 252/578 |
| 2014/0131640 | A1 * | 5/2014 | Sunkara | H01B 3/20 252/579 |
| 2014/0131642 | A1 * | 5/2014 | Sunkara | H01B 3/20 252/579 |
| 2014/0135522 | A1 * | 5/2014 | Sunkara | H01B 3/20 560/182 |
| 2020/0411208 | A1 * | 12/2020 | Liu | C08L 91/00 |
| 2024/0203633 | A1 * | 6/2024 | Ladani | H01B 3/20 |
| 2024/0347234 | A1 * | 10/2024 | Ladani | H01B 17/28 |

FOREIGN PATENT DOCUMENTS

| | | | | |
|---|---|---|---|---|
| CN | 111863407 | A | 10/2020 | |
| EP | 3544035 | A1 | 9/2019 | |
| EP | 3576108 | A1 | 12/2019 | |
| WO | WO-2016133332 | A1 * | 8/2016 | H01B 9/02 |
| WO | WO-2021058102 | A1 * | 4/2021 | H01F 27/02 |

OTHER PUBLICATIONS

Communication pursuant to Article 94(3) Epc, Ep Patent Application No. 21169580.4, mailed Aug. 20, 2024, 8 pages.

International Search Report and Written Opinon of the International Searching Authority, International Application No. PCT/EP2022/052874, mailed Apr. 19, 2022, 15 pages.

Knut Brede Liland, et al., “Ageing of Oil Impregnated Thermally Upgraded Papers”, Dielectric Liquids (ICDL), 2011 IEEE International Conference on, IEEE, XP032051524, Trondheim, Norway, Jun. 26, 2011, 5 pages.

* cited by examiner

BUSHING COMPRISING A CONDENSER BODY AND ELECTRICAL FACILITY WITH BUSHING

CROSS REFERENCE TO RELATED APPLICATIONS

This application is a 35 U.S.C. § 371 national stage application of PCT International Application No. PCT/EP2022/052874 filed on Feb. 7, 2022, which in turn claims priority to European Patent Application No. 21169580.4, filed on Apr. 21, 2021, the disclosures and content of which are incorporated by reference herein in their entireties.

TECHNICAL FIELD

The present disclosure relates to a bushing comprising a condenser body and an electrical facility with the bushing. The electrical facility may be a transformer or a switchgear, for example. The electrical facility may be a high voltage facility.

BACKGROUND

A bushing comprising a condenser body is also known as a capacitance-graded bushing. The bushing comprises a conductor, which may be a high voltage conductor. The bushing may enable the conductor to pass through a wall of an electrical facility, providing electrical insulation between the conductor and the wall. The wall may be on earth potential, for example. The condenser body may provide a uniform potential gradient of the electric field from the conductor to the wall. The condenser body may comprise insulating layers comprising a paper impregnated by an oil. Each of patent documents EP 3 576 108 A1 and EP 2 264 719 B1 discloses capacitance-graded high voltage bushings.

Furthermore, US 2020/411208 A1 discloses a high voltage bushing comprising a condenser core with aramid papers. The papers are impregnated by a gel being a mixture of an oil with a thickener and optional additives such as an anti-oxidant. US 2013/255899 A1 discloses a transformer in which the transformer paper comprises aramid fibers.

CA 645 157 A discloses a high voltage bushing comprising an absorbent material comprising organic paper, or an inorganic sheet material such as asbestos paper, or glass fiber fibre paper.

The paper by Knut Brede Liland et al: "Ageing of oil impregnated thermally upgraded papers" in DIELECTRIC LIQUIDS, 2011 (IEEE International Conference on Dielectric Liquids, 26 Jun. 2011, pages 1-5) discloses a transformer with a thermally upgraded paper.

EP 3 576 108 A1 discloses a high voltage bushing comprising a dielectric insulation impregnated with an ester liquid.

SUMMARY

It is an object to provide a bushing comprising a condenser body with improved properties.

According to an aspect of the disclosure, a bushing comprises an electrical conductor and a condenser body through which the electrical conductor extends. The condenser body comprises electrically insulating layers and electrically conducting layers, wherein the electrically insulating layers comprises a paper. The paper is oil-impregnated. The paper may comprise at least one of a thermally upgraded paper and a paper comprising synthetic fibers. The synthetic fibers may have a high heat resistance.

The paper may be based on cellulose material. A thermally upgraded paper has been chemically modified to reduce the decomposition rate of the paper. The thermally upgraded paper may be treated with nitrogen, for example. A nitrogen level in the thermally upgraded paper may be within a range of 0.5% to 5%, for example. More specifically, the nitrogen level may be in a range of 1% to 4%. The thermally upgraded paper may be in accordance with the standards IEC 554-3-1 and IEC 554-3-5, for example.

Synthetic fibers may comprise an aramid polymer, for example. The paper may be based on cellulose and the synthetic fibers may serve as a binder for the cellulose base material. The paper may both be thermally upgraded and comprise synthetic fibers.

Both by a thermally upgraded paper and by a paper comprising synthetic fibers, the thermal class rating can be increased. In this way, the paper and the entire bushing can withstand higher temperature such that the operation safety and the life expectancy is increased. As an example, the thermal class rating of the paper may be at least 120° C. Due to the high thermal class rating, the bushing can have a smaller diameter; without that the rate of aging is increased.

The paper may be impregnated by ester oil. Ester oil has the advantage of being biodegradable in contrast to mineral oil, for example. Accordingly, the bushing is more eco-friendly. The costs for safety installations and equipment can be lowered.

In addition to that, ester oil has a high moisture saturation point and, thus, removes moisture from the paper, which may increase the lifetime of the paper. Ester oil also has a high fire point, which makes the bushing safer.

According to a further aspect of the disclosure, an electrical facility comprises the bushing as disclosed in the foregoing. The electrical facility may comprise a wall in which the bushing is installed. The electrical facility may be high voltage facility. As an example, the electrical facility may be a transformer or switchgear facility.

The electrical facility may comprise a tank in which one or more electrical functional elements are located. As an example, a winding, such as a transformer winding, may be located in the tank. The tank may be filled by an insulating liquid, which may be ester oil, for example. In the case that ester oil is used for both the bushing and the tank, the entire electrical facility is more eco-friendly. Furthermore, fire hazard is reduced, increasing the safety of the electrical facility.

The electrical facility may be a transformer facility comprising one or more transformer windings. The transformer windings may comprise a further paper. The further paper may provide insulating layers located between electrically conductive layers of the windings. The further paper may be in the form of at least a thermally upgraded paper and a paper comprising heat-resistant synthetic fibers.

According to an embodiment, both the paper of the bushing and the paper of the transformer winding may have at least one of the same thermal upgrade and the same synthetic fibers. As an example, identical papers may be used for the transformer winding and the bushing. The further paper and the paper of the bushing may have the same temperature class. In this case, the entire electrical facility can withstand higher temperature such that the operation safety and the life expectancy is increased.

The present disclosure comprises several aspects and embodiments. Every feature described with respect to the bushing is also disclosed herein with respect to the electrical facility and vice versa, even if the respective feature is not explicitly mentioned in the context of the other aspect and embodiment. Accordingly, every feature described with respect to the bushing is also disclosed herein with respect to the electrical facility and vice versa.

BRIEF DESCRIPTION OF THE DRAWINGS

Further features, refinements and expediencies become apparent from the following description of the exemplary embodiments in connection with the figures. In the figures, elements of the same structure and/or functionality may be referenced by the same reference signs. It is to be understood that the embodiments shown in the figures are illustrative representations and are not necessarily drawn to scale.

DETAILED DESCRIPTION

Figure 1:
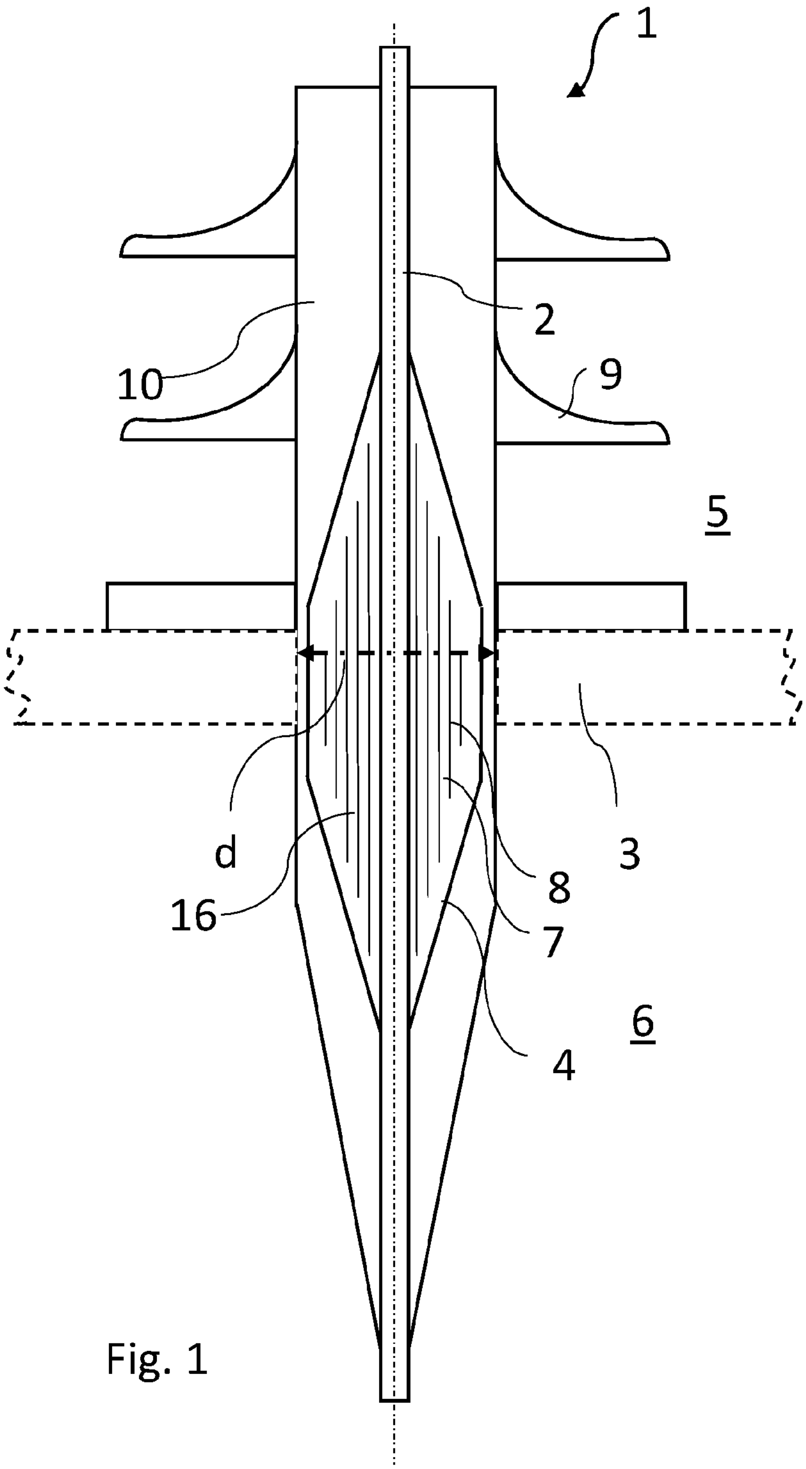
FIG. 1 is a schematic sectional view of a bushing according to an embodiment.

FIG. 1 shows a bushing 1 comprising a conductor 2. The bushing 1 and conductor 2 may be suitable for high voltage. The bushing 1 may be used in an electrical facility such as a switching or transformer facility. The facility may be a high-voltage facility.

The bushing 1 may provide an electrical connection of the facility through a wall 3 from the outside 5 to the inside 6. The wall 3 may be on earth potential or at least on an electric potential substantially different from the potential of the conductor 2. The bushing 1 provides the insulation between the wall 3 and the conductor 2. The wall 3 may be an outer wall of a transformer or switching facility, for example.

The insulation comprises a condenser body 4 comprising insulating layers 7 of an insulating material. Electrically conducting layers 8 are located at specific positions between the insulating layers 7. The condenser body 4 can be formed by winding a foil of insulating material on which electrically conductive material is applied at specific positions.

The bushing 1 further comprises an insulating material 10 enclosing the conductor 2. The bushing 1 further comprises insulating shreds 9 for enlarging a creeping distance at an outer surface of the bushing 1. Porcelain may be used as a material providing the insulation.

The bushing 1 may be an oil-to-air type insulation, for example. In other embodiments, the bushing 1 may be an oil-to-SF6 gas type or an oil-to-oil bushing, for example.

The insulating material of the insulating layers 7 can be in the form of a paper 16, such as kraft paper, for example. The paper 16 may be plain or in the form of crepe paper. The paper 16 may be cellulose-based.

The paper 16 can be thermally upgraded. A thermally upgraded paper 16 has been chemically modified to reduce the decomposition rate of the paper. Exemplarily, the modification serves to neutralize acids and reduce oxidation which may be caused by thermal degradation of the cellulose over the lifetime. Ageing effects may be reduced either by partial elimination of water forming agents (as in cyanoethylation) or by inhibiting the formation of water through the use of stabilizing agents (as in amine addition, dicyandiamide). The thermally upgraded paper may be in accordance with the standards IEC 554-3-1 and IEC 554-3-5 (DIN VDE).

The thermally upgraded paper may be treated with nitrogen. As an example, a nitrogen level in the thermally upgraded paper may be within a range of 0.5% to 5%, for example. More specifically, the nitrogen level may be in a range of 1% to 4%, for example.

Additionally or alternatively, the insulating layers 7 may comprise a paper 16 comprising synthetic fibers. As an example, the fibers may be aramid fibers. The fibers may be highly heat-resistant. Also in this case, the thermal class rating can be increased and the lifetime prolonged.

Exemplarily, the paper 16 may comprise cellulose and an aramid polymer. The aramid fibers may serve as a binder for the base material of the paper 16 such as cellulose, for example. As an example, a paper of the trademark Nomex® can be used.

The insulating layers 7 are oil-impregnated. According to specific embodiments, the insulating layers 7 are impregnated by ester oil. The ester oil may be synthetic or natural ester oil.

Ester oil has the advantage of biodegradability in contrast to mineral oil, for example. Accordingly, the bushing is ecofriendly. The costs for safety installations and equipment can be lowered. In this case, the bushing is also suitable for indoor applications.

In addition to that, ester oil has a high moisture saturation point and, thus, removes moisture from the paper 16. This increases the lifetime of the paper 16 and prevents generation of free water. In addition to that, ester oil has a low pour point of −56° C., such that the bushing is suitable for very low temperature areas. Furthermore, ester oil has a high fire point, above 200° C., which makes the bushing safer.

Exemplarily, the bushing may comprise thermally upgraded papers impregnated by ester oil. Such a paper may have a thermal class rating of 140° C. In comparison, a thermally upgraded paper impregnated by mineral oil may have a thermal class rating of 130° C. In a further comparison, a paper which is not thermally upgraded and is impregnated by mineral oil may have a temperature limit of 105° C.

In a fault or overload condition during transformer operation, the bushing 1 can be subjected to high currents and high temperature, which may boost aging of the paper. Aging may lead to a substantive loss of insulating properties. Due to the higher thermal class for the thermally upgraded paper, aging of the paper is reduced. Thus, the bushing 1 has a high overload capability, providing safer operation with a high life expectancy. Accordingly, fire hazard during manufacturing, testing and operation is reduced. In addition to that, the risk of breakage of an insulation such as a porcelain insulation is reduced. In addition to that the bushing can have a smaller diameter d without increasing the rate of aging.

Figure 2:
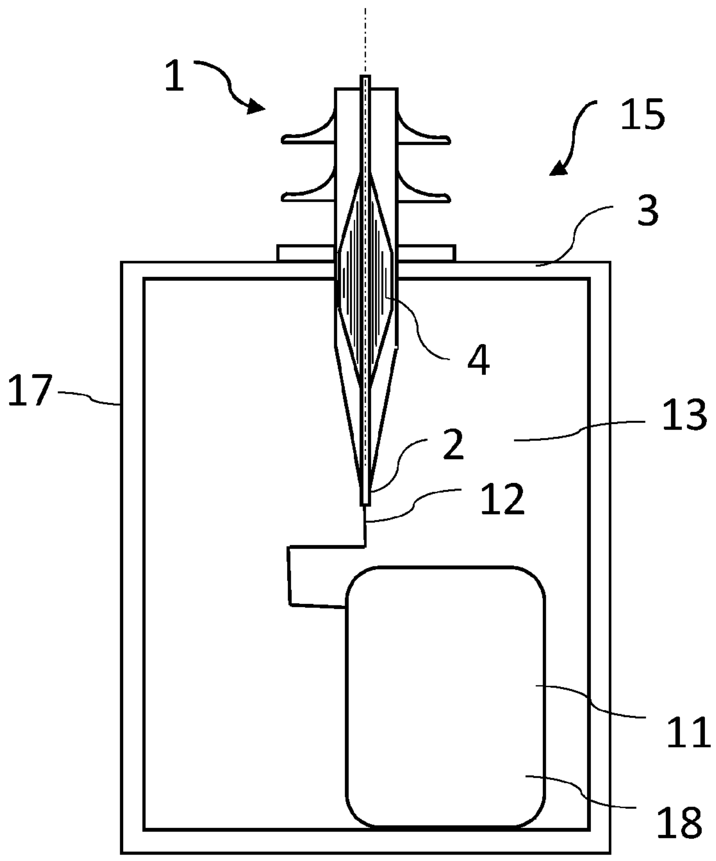
FIG. 2 is a schematic view of a transformer according to an embodiment.

FIG. 2 shows an electrical facility 15, which may be a high voltage facility. The electrical facility 15 may be a transformer facility or a switchgear facility, for example.

The electrical facility 15 comprises a bushing 1 leading through a wall 3. The bushing 1 can be the bushing 1 of FIG. 1.

In the shown embodiment, the wall 3 is the wall 3 of a tank 17 in which a functional element of the electrical facility is located. The electrical facility 15 may be a transformer and the functional element may be at least one transformer winding 11. An electrical connection 12 leads from the conductor 2 to the transformer winding 11.

The tank 17 may be filled with an insulating liquid 13. The insulating liquid 13 may be ester oil. Exemplarily, also the paper 16 of the bushing 1 may be impregnated with ester oil. In this case, both for the bushing 1 and the tank 17 a biodegradable liquid is used such that the transformer arrangement 15 is environment-friendly. In addition to that, the bushing 15 is adapted to the high overload capability of the ester-filled tank 17 such that the overload capability for the entire electrical facility 15 is increased.

The transformer winding 11 may comprise a further paper 18. The further paper 18 may provide insulating layers in the transformer winding 11. The further paper 18 may be at least one of a thermally upgraded paper or a paper comprising synthetic fibers. As an example, the further paper 18 and the paper 16 of the bushing 1 may have the same temperature class. Both the further paper 18 of the transformer winding 11 and the paper 16 of the bushing 1 may have the same thermal upgrade or may comprise the same synthetic fibers.

REFERENCE SIGNS

1 bushing
2 electrical conductor
3 wall
4 condenser body
5 outside
6 inside
7 electrically insulating layer
8 electrically conducting layer
9 shred
10 insulating material
11 transformer winding
12 electrical connection
13 insulating liquid
14 transformer insulation
15 electrical facility
16 paper of bushing
17 tank
18 paper of transformer winding
d diameter

The invention claimed is:

1. An electrical facility comprising a tank and a bushing leading through a wall of the tank, the bushing comprising:
an electrical conductor and a condenser body through which the electrical conductor extends,
wherein the condenser body comprises electrically insulating layers and electrically conducting layers, wherein the electrically insulating layers comprise an oil-impregnated paper, wherein the paper comprises a thermally upgraded paper that includes synthetic fibers, wherein the paper is impregnated by ester oil, and wherein the tank is filled by ester oil.

2. The electrical facility of claim 1, wherein the paper is based on cellulose.

3. The electrical facility of claim 1, wherein the paper is a thermally upgraded paper with a nitrogen level in a range of 1% to 4%.

4. The electrical facility of claim 1, wherein the paper comprises heat-resistant synthetic fibers in a form of an aramid polymer.

5. The electrical facility of claim 1, wherein the paper has a thermal class rating of at least 120° C.

6. The electrical facility of claim 1, being a transformer facility comprising one or more transformer windings, wherein the one or more transformer windings comprise a further paper in a form of at least one of a thermally upgraded paper and a paper comprising heat-resistant synthetic fibers.

7. The electrical facility of claim 6, wherein the paper of the bushing and the paper of the one or more transformer windings have at least one of a same thermal upgrade and same synthetic fibers.

* * * * *